Patented Apr. 26, 1927.

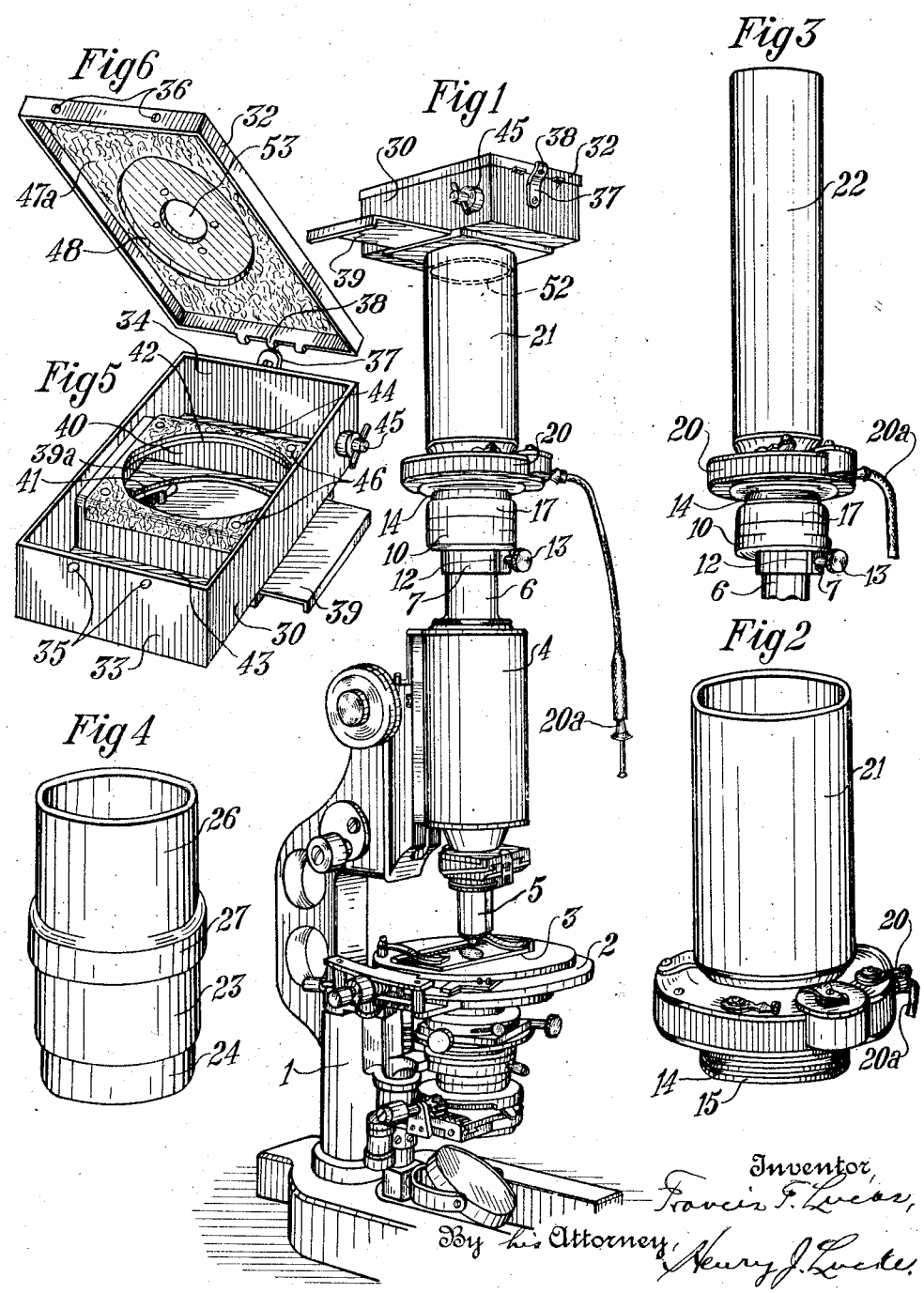

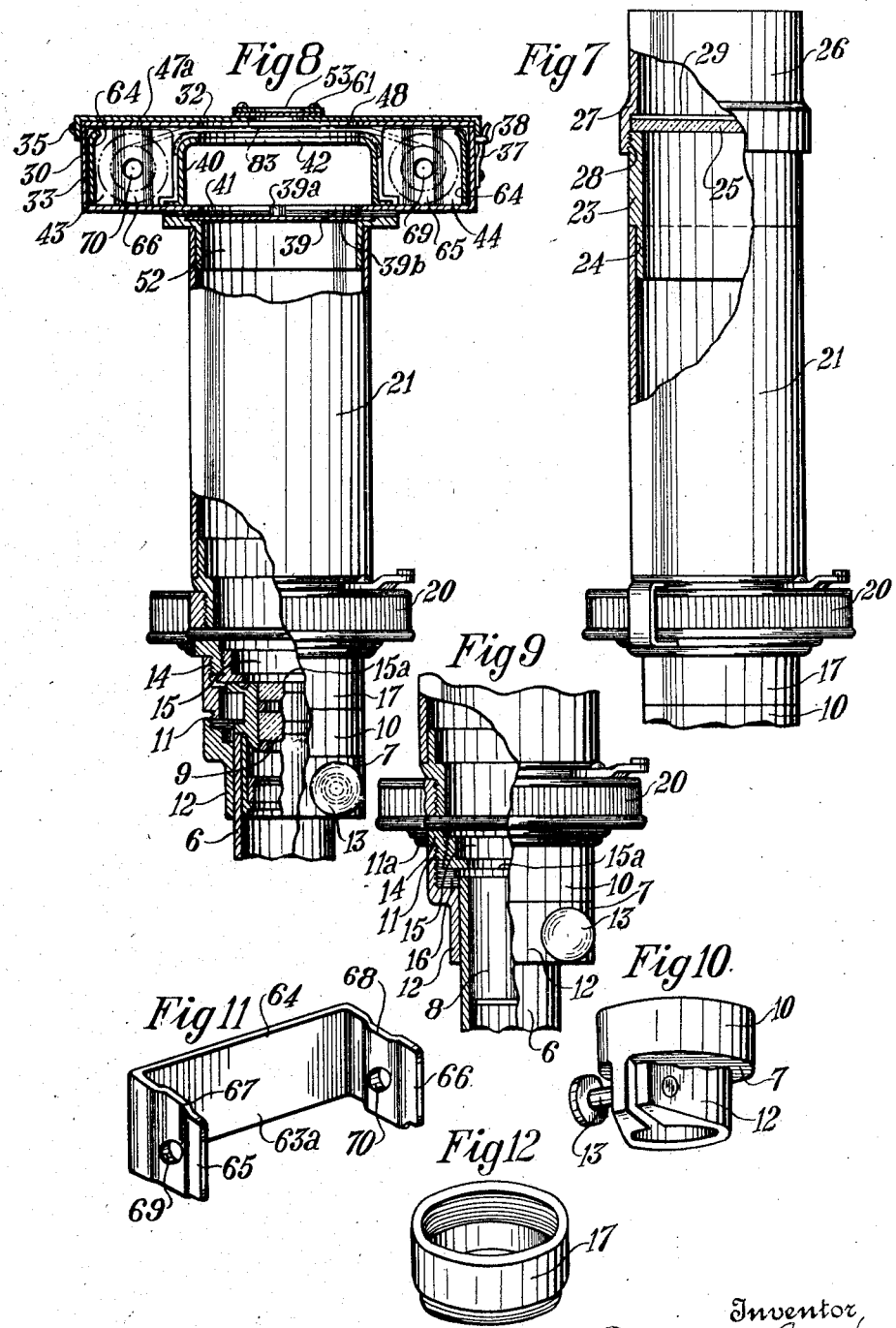

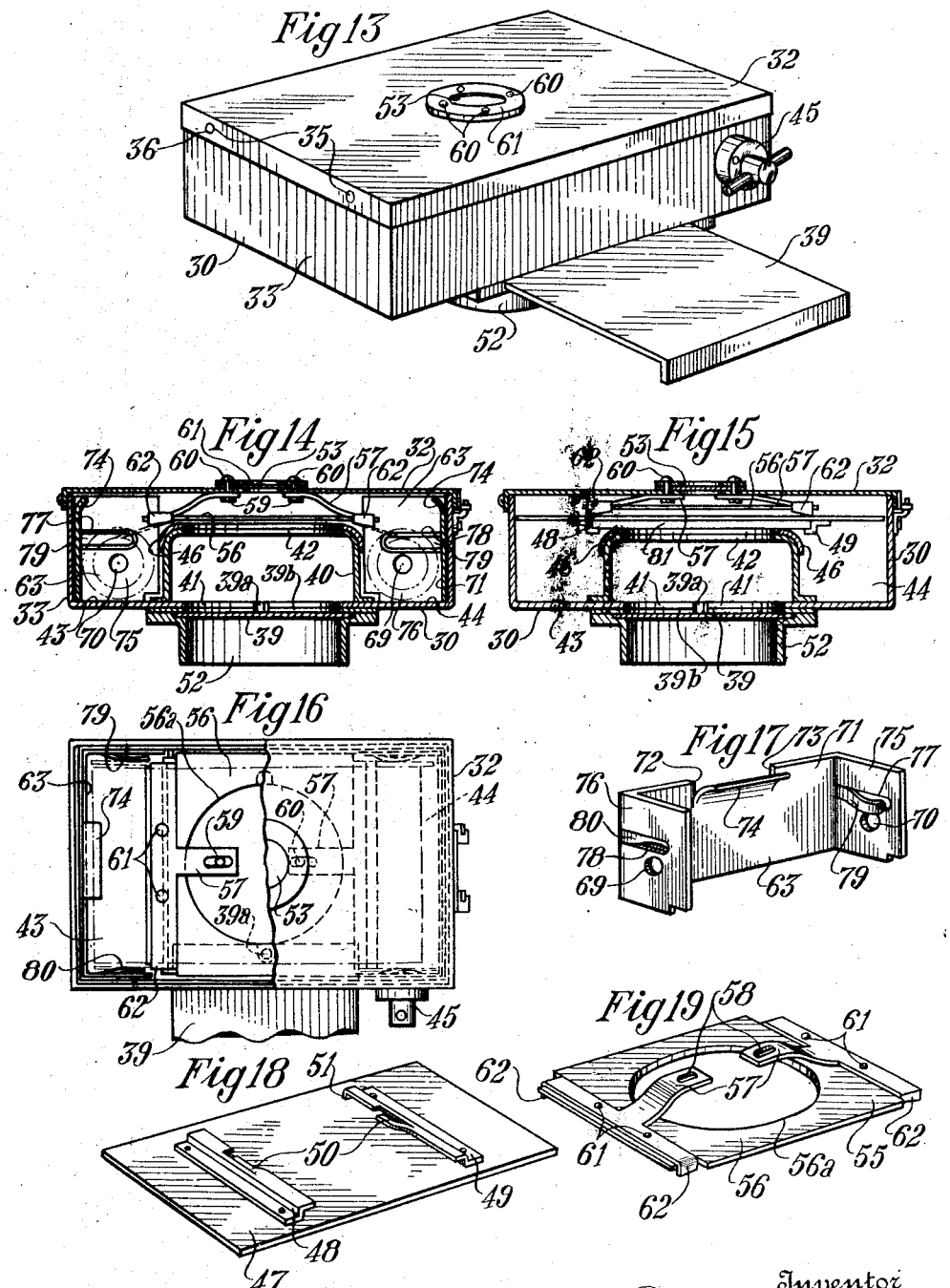

1,625,952

UNITED STATES PATENT OFFICE.

FRANCIS F. LUCAS, OF EAST ORANGE, NEW JERSEY.

PHOTOMICROGRAPHIC CAMERA.

Original application filed November 22, 1921, Serial No. 517,017. Divided and this application filed December 29, 1923. Serial No. 683,290.

This invention relates to an observing and photographic appliance and an improved method of focusing and obtaining photographic reproduction with reference in particular to its adaptation as a photomicrographic camera.

An object of this invention is to provide a photomicrographic camera for attachment to the draw tube of a microscope; consisting of a clamping member; preferably a shutter; an extension tube; a light tight container capable of holding for exposure a sensitized roll film or interchangeably a sensitized roll film and a sensitized plate, said light tight container being interchangeable with a ground glass or equivalent screen containing member fitted with a light shield enabling observation and focusing of the image without the use of a focusing cloth.

A further feature of this invention is to provide for taking photomicrographs on sensitized roll film; the film being held taut in a plane, preferably at right angles to the optical axis so that no part of the film under exposure will be out of focus due to deviation of the film from such plane.

A further object of the invention is to provide a photomicrographic camera of simple construction and of light weight so that it may be supported by the draw tubes of common forms of microscopes without causing the focus of the optical system to change after adjustment once has been made.

A further object of this invention is to provide a photomicrographic camera supported by the draw tube of a microscope in such manner that mechanically it becomes an integral part of the microscope and whereby extraneous vibration results in vibrating both the photomicrographic attachment and the microscope as a unit.

A further object of this invention is to provide an observing appliance which may be rigidly attached to the draw tube of a microscope, or to other optical instruments, said appliance to consist of a clamping member; preferably a shutter; an extension tube and a ground glass or equivalent screen containing member fitted with a light shield such that a projected image from the microscope, or equivalent, may be viewed by one or more persons in a normal and natural manner and without the aid of a focusing cloth. Such arrangement enables the microscope and observing appliance to be assembled and to be used in a room having about the usual or average intensity of illumination.

A further feature of this invention is to provide a photomicrographic camera capable of rigid attachment to the draw tubes of common forms of microscopes such that the longitudinal arrangement of the parts becomes definitely fixed thus enabling successively focused objects to be photographed on a sensitized roll film or a sensitized plate under definitely comparable conditions without adjustment of the parts of the camera proper. Said objects may be photographed at the same setting of the microscope and photomicrographic camera or at intervals of time as desired, notwithstanding that the microscope and photomicrographic camera may have been dismantled in the meantime and later reassembled.

A further object is to provide a method of micrometer whereby an image of a micrometer scale such as the usual stage micrometer may be superimposed on the image of an eyepiece micrometer such as the usual form of cross section or cross ruled eyepiece scale and in this position exposure made on a sensitized roll film. The object to be measured is then substituted for the stage micrometer and superimposed thereon will be the image of the eyepiece micrometer. Exposure is then made on the same roll film so that after development of the film there will be had a photographic record of a standardized scale of measurement and a successive number of objects as desired with the eyepiece micrometer scale superimposed thereon. Thus the dimensions of the objects may be readily computed in terms of the standardized scale, a record of which is permanently preserved, and all variables due to differences in film or treatment are thus eliminated.

A further object of this invention is to provide a light tight container capable of holding interchangeably for photographic exposure a sensitized roll film or a sensitized plate.

Further features and objects of the invention will be more fully understood from the following detail description and the accompanying drawings, in which—

Fig. 1 is a front perspective view of a microscope provided with my invention, the parts being shown at the stage of taking the exposure;

Fig. 2 is a detail front perspective view of the shutter and its short length tube;

Fig. 3 is a detail front perspective view of the shutter and its long length tube;

Fig. 4 is a detail front perspective view of the focusing ground glass and its mounting tubes;

Figs. 5 and 6 are respectively detail perspective views of one form of light-tight container for the sensitized medium and its cover;

Figs. 7 and 8 are comparative front elevations respectively of the focusing ground glass mounted on the shutter tube and of the container mounted on the shutter tube; Fig. 7 is broken away to show the assembly of the ground glass disk and the parts of its tubes, whereas Fig. 8 is broken away in central vertical elevation through the light-tight container and also through the shutter and through the parts for supporting and attaching my improved photomicrographic device to the microscope proper;

Fig. 9 is a detail elevation, partly in vertical sectional view, showing the shutter and a simple form of eye-piece;

Fig. 10 is a detail perspective view of the clamping ring shown in Figs. 1 and 8;

Fig. 11 is a detail perspective view of a clip for a film spool; and Fig. 12 is a detail perspective view of a compensating ring;

Fig. 13 is a perspective view on an enlarged scale of the container shown in Figs. 6 and 8;

Fig. 14 is a central vertical sectional elevation of the container shown in Fig. 13, as used with a roll film but modified to accommodate either a sensitized plate or a roll film;

Fig. 15 is a central vertical sectional elevation of the container shown in Fig. 14, as used with a sensitized plate;

Fig. 16 is a bottom plan view of Fig. 14, the bottom of the container being partly broken away to show otherwise hidden parts;

Fig. 17 is a detail perspective view of a modified form of clip for the film spool;

Fig. 18 is a detail perspective top view of the holding plate for a sensitized plate; and Fig. 19 is a detail perspective bottom view of the guide and compensating pressure plate for use with a roll film and for securing the holding plate, Fig. 18, for use with a sensitized plate.

Referring to Fig. 1, I have illustrated an approved type of microscope 1, including the adjustable stage 2 on which the specimen 3 to be photographed is supported, and further comprising the body tube 4, provided with suitable means for attachment of the objective 5 and the draw tube 6 telescoping with the body tube 4.

Pursuant to my invention, I provide, as appears in assembly in Figs. 1, 8 and 9, and in detail in Fig. 10, a clamping ring 7 to be received on the terminal portion of the draw tube 6, and in which ring 7 is placed the simple eye-piece 8 as appears in Fig. 9 or a compensating eye-piece 9, as is indicated in Fig. 8. Such clamping ring 7 comprises the annular portion 10 which is internally threaded at 11, see Figs. 8 and 9, and also the radially slitted extension 12 having the clamping screw 13.

When a simple eye-piece 8 is employed, the external threading of the short lower tube 14 of the shutter, see Fig. 2, is brought into mesh with the internal threading 11 of the clamping ring 10 and I provide the positioning ring 15, see Figs. 2 and 9, for engagement directly with the metal casing of the eye-piece 8. Such positioning ring 15 is externally threaded to mesh with the internal threading of the lower tube length 14 of the shutter, and is flanged at 16 to extend laterally to abut the lower edge shutter tube 14.

Accordingly, upon placing the eye-piece 8 within the ring 10 and thereupon securing the lower tube length 14 of the shutter within the ring 10 until the ring 10 abuts tightly against the shutter 20 as shown at 11ª, Fig. 9, the ring 10 with the shutter 20 attached thereto and enclosing the eye-piece 8, is located on the draw tube 6 by allowing the clamping ring, 12, Figs. 9 and 10, to slide downwardly on the draw tube, 6, of the microscope, until the head of the microscope draw tube 6 abuts the flanged extension of the casing of the eye-piece, 8, and until the positioning ring 15, rests upon the top of the eye-piece in the position clearly shown at 15ª, Fig. 9; whereupon the clamping screw, 13, of the clamping ring 10, is tightened. This adjustment of the parts insures that the eye-piece assumes its normal position with reference to the microscope draw tube 6 and it also insures that my improved observing or photographic appliance will assume a definite and exact position longitudinally with reference to a given combination of parts such as the draw tube, 6, and eye-piece 8. Moreover, it will be clearly seen that the parts may be dismantled and reassembled whereupon the same exact optical arrangement of the parts will result.

While I have shown the use of an eye-piece, the eye-piece may be omitted if desired whereupon the positioning ring, 15, comes to rest upon the head of the microscope draw tube, 6, instead of upon the top of the eye-piece as shown at 15ª, Fig. 9.

When it is desired to use certain forms of eye-pieces such that the upper lens of the eye-piece is designed to project materially above the head of the microscope draw tube, a type of which is indicated at 9, a compensating ring 17 of suitable dimensions is employed, as is indicated in Fig. 8, such compensating ring 17 being internally threaded at its upper portion to mesh with the external threading of the tube length 14 of the shutter; the ring 17 is externally threaded to mesh with the internal threading 11 of the clamping ring 10.

It will be understood that all various types of eye-pieces for microscopes may be employed if desired and the compensating ring selected of an effective length corresponding to the extent of projection of the eye-piece above the end of the draw tube of the microscope.

The shutter indicated at 20 is of any approved type and may be provided with a short upper tube 21, as is indicated in Fig. 1 and enlarged in Figs. 2, 7 and 8, or may be provided with the long upper tube 22, as is indicated in Fig. 3. Usually such short length tube 21 for commercial forms of microscopes and with a commonly used type of shutter, is of the length of three inches and the long tube 22 with a commonly used type of shutter, is of the length of eight inches, providing respectively for magnification in the proportion of one to two, the images respectively being formed at distances of five and ten inches from the eye-piece. The absolute magnification, as will be understood by those skilled in the art, is determined by the optical constants of the microscope.

In carrying out my invention, I prefer the use of a focusing ground glass and mounting tube therefor, as is indicated in external appearance in Fig. 4, and in detail construction in Fig. 7. Such ground glass unit comprises the lower tube section 23 having the lowermost end portion 24 reduced to be received within the tube length 21 (or 22) of the shutter and to be held thereon. The ground glass disk 25 is suitably held between the lower tube section 23 and the upper tube section 26, as by providing the expanded annular portion 27, recessed annularly inwardly to receive the ground glass disk 25 and provided at its lower end with the threading 28 meshing with the threading 29 at the upper end of the lower tube section 23.

The effective upward extension of the tube length 26 is such that the image displayed on the ground glass 25 is not naturally affected by indirect sunlight or by light from any other external source entering the tube length 26 I have found that a tube-length of about one and one-half inches for ordinary types of microscopes, has given excellent results. Such arrangement provides for viewing the image and for focusing without the use of a focusing cloth. The arrangement has also the advantage of allowing the observer to use both eyes in the natural manner and in normal position. Furthermore, the arrangement has the particular advantage of allowing any number of persons to view the image at the same time, so that details of structure or other characteristics of the specimen under examination may be clearly seen or explained. In Fig. 7 I have indicated the ground glass and its associated tube lengths mounted on the shutter tube which in turn is mounted on the microscope, as is more fully indicated in Fig. 1, in which instance the image of the specimen 3 is readily and definitely viewed with both eyes of the observer or may be viewed by two or more persons at the same time. It will be understood that the shutter in such circumstance has been moved to its open position.

After the proper image has been had by observation through the ground glass 25, the container 30, loaded either with a sensitized film or a plate, is then positioned in replacement of the ground glass 25 and its mounting tubes 23, 26, firstly by closing the shutter, and removing the ground glass unit and then placing the container 30 on the end of the shutter tube 21 (or 22), and thereafter opening (as shown in Fig. 1) the slides 39 of the container 30.

The shutter 19 is then operated by means of its release 20a, see Fig. 1, and the exposure thus carried out. The slide 39 is then closed, and the film wound forward for the next exposure. In the event that the exposure is made on a sensitized plate, the container is taken into a dark-room or equivalent, for removal of the exposed plate and reloading of a fresh plate.

In Figs. 5 and 6 I have shown a simplified form of the container 30, which form comprises the back 32 removably secured to the opposite ends 33, 34, of the body of the container 30, by the provision of the pair of pins 35 extending on the end 33 and taking within the pair of openings 36, 36 at the side of the cover 32 and by the provision of a spring finger 37 secured to the opposite end 34 and having a notch for receiving the locking lug 38 on the cover 32.

The container 30 is provided at its bottom with the slide 39 for closing the container in light sealing relation when moved inwardly, and for opening the camera when moved outwardly, as is indicated in Fig. 1.

Within the container is provided the spacing frame 40 having a circular opening 42 which registers in position in its plane with a circular opening 41 in the bottom of the container. The contour of the spacing frame 40 provides within the casing 30 of the container for the compartment 43 for receiving the spool of the unexposed sensitized film roll and for the compartment 44 for receiving the spool on which the exposed film is wound. The stud shaft 45 for winding the film forward and for maintaining the film taut, in cooperation with a ratchet, is of the usual form. Preferably, the upper face of the frame 40 is lined with velvet 46 or equivalent, for light-tight engagement with the film. Similarly, the inner face of the cover 32 is lined with velvet or equivalent, as is indicated at 47ª, but with a circular opening 48 of an area corresponding to the opening 42 of the spacing frame 40 and positioned in register therewith, as is indicated in Fig. 8, whereby the film is held securely and in light-tight relation between the two velvet surfaces excepting for the area in alignment with the openings 41, 42, where the film is thus maintained in a plane at right angles to the optical axis of the microscope and the photomicrographic attachment.

The bottom of the camera proper 30 is equipped with the short tube length 52, as is shown in Fig. 8, to be received within the shutter tube length 21 (or 22).

The peep hole 53, fitted with the usual red transparent material such as celluloid, is provided for the purpose of observing the markings on the protective paper of the film, according to common practice.

The preferred form of the container 30 is shown in Figs. 13 to 19 inclusive. On the inner face of the cover 32 I omit the velvet lining 47ª shown in Fig. 6, and in lieu thereof, I substitute the compensating guide and compression member 55 comprising the guide plate 56 having the rearwardly extending, oppositely disposed spring feet 57, respectively provided with the elongated slots 58 through which extends the headed studs 59, the rearward ends 60, 60 of which are riveted to the rear cover 32, as by riveting the ends 60, 60 to the ring 61 of the peep hole 53. The spring feet 57 may be formed of metal stampings and secured by rivets 61 to the guide plate 56. The guide plate 56 is cut away at its four corners and enlarged guide lugs 62 provided for attaining guidance of the opposite edges of the film. The plate 56 is provided with the central opening 56ª, permitting observation of the film markings through the peep hole 53 and also for maintaining the portion of the film under exposure, in a plane at right angles to the optical axis of the microscope and associated photomicrographic attachment.

As will be noted in Figs. 19 and 14, such guide lugs 62 extend beyond the plane of the guide plate 56 to be effective in receiving and guiding the edges of the exposed and unexposed portions of the film, respectively anterior of and posterior of the exposure opening 42. The clip 63 for holding the spool of the sensitized film roll may be of the construction 63ª shown in Fig. 1 but is preferably of the construction shown in Fig. 17. In Fig. 11 the clip 63ª comprises the vertically extending portion 64 having the oppositely disposed spring, ends 65, 66 bent angularly inwardly at 67, 68 and provided with the openings 69, 70 for receiving the ends of the shaft of the film spool. The inwardly bent portions 67, 68 frictionally engage the opposite end disks of the film spool to brake the spool when the film is being drawn forward to the winding-up spool and to hold taut in horizontal plane the portion of the film between the spools.

In the preferred form as shown in Fig. 17, the clip 63 comprises the vertically extending plate 71 which is slitted at 72, 73 to provide the curved tongue 74, to facilitate removal of the clip 63 from the container 30. The ends 75, 76, of the clip 63 are cut out respectively at 77, 78 to provide the tongues 79, 80 respectively bent inwardly, and preferably curvedly, which tongues 79, 80 make frictional engagement with the disks of the film spool, to brake the same, similarly as above. The perforation 69, 70 receive the end studs of the film spool. Such clips 63, 63ª are preferably formed of spring metal and stamped of the form and arrangement shown in Figs. 11 and 17, thereby providing for reversable use of the clips either for the winding-on spool or the reeling-off spool.

When it is desired to subject a sensitized plate to exposure in lieu of a sensitized film, the holding plate 47, as indicated in Fig. 18 is employed, and positioned in advance of the compensating guide and compression member 55, as is indicated in Fig. 15. The sensitized plate is indicated in Fig. 15 at 81. It will be noted that the container 30 in the embodiment shown in Figs. 14, 15 and 16 is of increased height as compared with the form shown in Figs. 5, 6 and 8, to provide for the additional space occupied by the compensating guide and compression member 56 and its spring feet 57, and to maintain the position of the portion of the film or of the plate to be exposed.

When it is desired to use a sensitized plate in lieu of a sensitized film I provide a holding plate 47 of metal or other suitable material, and provided on the downward face with the oppositely positioned and guide clips 48, 49. Such clips 48, 49 are preferably slitted at 50 and bent toward the holding plate 47 to frictionally engage the sensitized plate when inserted within the guide clips 48, 49. The guides 48, 49 are also provided with the projections 51 (one only shown in Fig. 18) for limiting the extent of insertion of the sensitized plate within the clips 48, 49.

The plate 47 when placed in the container 30, is held in proper position by the spring lugs 62 as is indicated in Fig. 15, and when thus positioned the peep hole 53 and the opening 56ª in the plate 56 is closed, to protect the sensitized plate.

It will be noted that the slide 39 functions in contact with the packing 39$^b$ of velvet or the like to provide for a light-tight seal and facilitates the movement of the slide 39 to its closed and open positions, so that the optical adjustment of the parts is not disturbed.

The travel and position of the slide 39 is regulated by the pin 39$^a$, as is indicated in Figs. 5, 14, 15 and 16.

From the detail description set forth hereinabove, the construction and operation of my invention will be largely understood, and a general summary of the manner of using the same is deemed to be sufficient.

Upon proper adjustments of the parts of the microscope in the usual manner to obtain the magnified image of the desired portion of the specimen by observation through my ground glass unit assembled on the microscope as shown in Fig. 7, the ground glass unit is then taken off and the container substituted in the place of the ground glass unit as shown in Fig. 8, and the exposure is made either for a film or a plate as desired. It will be noted that Figs. 7 and 8 are arranged for direct comparison with one another, the upper edge of the tube length 21 of the shutter being in the same plane in both Figs. 7 and 8 and the ground glass disk 25 being in the same effective plane as the portion 83 of the film under exposure.

Upon desiring a further exposure of a different portion of the same specimen or of a different specimen, and for either the same or different magnification, the container is removed from the shutter unit and the ground glass unit replaced on the shutter unit for observing and focusing the image, whereupon the container is again resubstituted for the ground glass unit and exposure made. In the event that different magnification is desired, it is of course understood that the optical constants of the system must be changed either by substituting the desired lens or by changing the shutter tubes 21 and 22.

It will be noted that such successive exposures are obtained under conditions of reproduction of the same or directly computable proportions thereby affording mathematically exact comparison between the dimensions of the derived photographic reproductions.

It will be further noted that with the use of my invention, the respective parts are assembled with exactitude and certainty and without relying upon the judgment of the operator.

My invention, as has been noted above, is adapted for all approved types of microscopes, including the use of compensating and special eye-pieces as well as simple or the usual forms of eye-pieces, and for the use of films and plates as the sensitized media.

It will be understood that my improved apparatus and improved method of focusing and taking exposures is applicable for use with telescopes and other types and forms of optical devices for photographic reproduction.

This application is a division of my original application Serial No. 517,017, filed by me on November 22nd, 1921, now matured as U. S. Patent No. 1,537,539, dated May 12th, 1925, wherein is described and claimed the holder for the sensitized film or plate and the associated parts to provide for the self-positioning of the sensitized medium and means for holding the portion of the film taut and the associated parts. My copending application Serial No. 683,289, also a division of my aforesaid original application Serial No. 517,017, is directed to the arrangement of the carrier for the ground glass and the associated parts for attaining a light-tight connection with a suitable optical image-forming device and for excluding light foreign to the rays forming the image, to thereby permit the image to be seen through the carrier by a number of persons at the same time and without the use of any focusing cloth or equivalent.

Whereas I have described my invention by reference to specific forms thereof it will be understood that many changes and modifications may be made without departing from the spirit of the invention.

I claim.

1. The combination with an image-forming device having an adjustable tube, of means for deriving the image formed in said image-forming device, and means for clamping said image deriving means to the adjustable tube of said image-forming device, said clamping means providing for a clearance for different sizes of visual lenses and a set screw for securing said clamping means to said adjustable tube.

2. The combination with a microscope, of means for deriving the image formed by the eye-piece and the objective of said microscope and means for clamping said image deriving means to the draw tube of said microscope, said clamping means comprising a sleeve providing for eye-pieces of different extents of projections externally of the end of said draw tube and means for clamping said sleeve to said draw tube.

In testimony whereof I have signed this specification this 18th day of December, 1923.

FRANCIS F. LUCAS.